United States Patent [19]

Wuskell

[11] 4,255,554
[45] Mar. 10, 1981

[54] PROCESS FOR PREPARING PHENOL-FORMALDEHYDE-FURFURYL ALCOHOL TERPOLYMERS

[75] Inventor: Joseph P. Wuskell, Barrington, Ill.

[73] Assignee: The Quaker Oats Company, Chicago, Ill.

[21] Appl. No.: 84,801

[22] Filed: Oct. 15, 1979

[51] Int. Cl.³ .................... C08G 8/04; C08G 8/08; C08G 14/02
[52] U.S. Cl. ................... 528/129; 525/508; 528/139; 528/140; 528/159
[58] Field of Search ............... 528/159, 139, 140, 129; 525/508

[56] References Cited

U.S. PATENT DOCUMENTS

| 3,108,978 | 10/1963 | McNaughtan | 528/129 |
| 3,312,650 | 4/1967 | Case | 528/129 |
| 3,549,584 | 12/1970 | Sekera | 260/38 |
| 3,725,333 | 4/1973 | Adkins et al. | 260/38 |
| 4,051,301 | 9/1977 | Laitar | 528/159 |
| 4,108,809 | 8/1978 | Narayan et al. | 528/159 |
| 4,125,489 | 11/1978 | Narayan et al. | 521/136 |
| 4,161,576 | 7/1979 | Vasishth | 528/139 |

FOREIGN PATENT DOCUMENTS 861302  5/1978  Belgium .

Primary Examiner—Harry Wong, Jr.
Attorney, Agent, or Firm—Neuman, Williams, Anderson & Olson

[57] ABSTRACT

Phenol-formaldehyde-furfuryl alcohol terpolymers containing substantially equimolar proportions of phenol and furfuryl alcohol are prepared by reacting phenol, formaldehyde and furfuryl alcohol under essentially anhydrous conditions in the presence of a metallic catalyst with continuous removal of the water of condensation from the reaction mixture.

5 Claims, No Drawings

PROCESS FOR PREPARING PHENOL-FORMALDEHYDE-FURFURYL ALCOHOL TERPOLYMERS

This invention relates to phenolic resins containing high levels of furfuryl alcohol.

The utility of phenol-furfuryl alcohol-formaldehyde resins as foundry binder compositions, laminating and molding resins is well known. Likewise, procedures for preparing such resins have been disclosed in the art. Thus, for example, U.S. Pat. No. 3,312,650 discloses binder compositions comprising an aqueous solution of the condensate of a phenol-furfuryl alcohol-formaldehyde and additional furfuryl alcohol. The condensate is prepared from phenol and furfuryl alcohol in an acidic aqueous medium and after the initial reaction, the reaction mixture is made basic and further reacted with aqueous formaldehyde. Additional furfuryl alcohol can then be admixed so as to be available for reaction with acid curing agents. From 0.2 to 0.5 mole of furfuryl alcohol per mole of phenol is used to form the condensate product. U.S. Pat. No. 4,051,301 discloses furan modified phenolic novolak resins prepared in aqueous medium at an acid pH. In the resins produced in accordance with this patent, the mole ratio of furfuryl alcohol to the phenol is within the range of 0.04 to 0.9 and the mole ratio of aldehyde to the total number of moles of the phenol and the furfuryl alcohol is from 0.5 to 0.85 mole.

It is a principal object of this invention to provide novel phenol-furfuryl alcohol-formaldehyde resins containing a high proportion of furfuryl alcohol.

In accordance with this invention, phenol-furfuryl alcohol-formaldehyde resins are prepared in a manner whereby high levels of furfuryl alcohol are incorporated in the resins.

The resins are prepared by reacting phenol, formaldehyde and furfuryl alcohol under essentially anhydrous conditions in the presence of a metallic catalyst with continuous removal of the water of condensation from the reaction mixture. The reaction can be conducted in one step with all three reactants, phenol, formaldehyde and furfuryl alcohol, initially present in the reaction mixture or in two steps where the phenol and formaldehyde are reacted first, followed by the addition of furfuryl alcohol. In either case, novel resins are prepared containing substantially equimolar proportions of phenol and furfuryl alcohol.

The reaction is conducted in an organic medium utilizing as the medium organic solvents which form azeotropes with water. Suitable organic solvents include benzene, toluene, xylene, dioxane, ethyl acetate, ethylene chloride and the like.

A divalent metallic catalyst which is soluble in the organic solvent is employed to catalyze the reactions. Representative divalent metallic catalysts suitable for use are those salts soluble in organic solvents of such metals as zinc, calcium, copper, tin, cobalt, lead, calcium and iron. Examples of such catalysts are zinc naphthenate, lead napthenate, calcium naphthenate, stannous octoate, cobalt naphthenate, manganese naphthenate and ferric octoate. The catalyst is utilized in amounts ranging from about 0.5 to 10% by total weight of the reactants.

The reaction is carried out at elevated temperatures on the order of 75° to 160° C. and preferably 100° to 120° C. The reactions are usually substantially complete in about 6 hours and accordingly reaction times of 4 to 12 hours or more are generally employed to prepare the resins. Water of condensation is to be continuously removed from the reaction mixture to insure that the reaction is conducted under essentially anhydrous conditions. Therefore, the reactions are carried out in equipment provided with means for removing the water of condensation from the reaction. Suitable means for removing the water of condensation from the reaction mixture include distillation, azeotropic distillation and so forth.

Phenol is preferred as the phenolic reactant to produce terpolymers according to this invention. However, substituted phenols, except those substituted in all ortho and para positions, can be used. A preferred class of phenols for use in accordance with the invention are phenols having the formula:

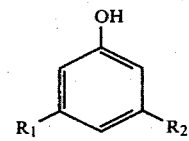

wherein $R_1$ and $R_2$ is hydrogen, a hydrocarbon radical, an oxyhydrocarbon radical or halogen. Specific examples of the phenolic reactant include m-cresol, p-cresol, 3,5-, 3,4-xylenol, octyl phenol, nonyl phenol, 3,5-dimethoxy phenol and the like.

The aldehyde reactant used in preparing the terpolymer according to this invention is an aldehyde of the formula R—CHO, wherein R is a hydrocarbon radical containing 1 to 8 carbon atoms such as formaldehyde, acetaldehyde, propionalaldehyde, furfuraldehyde, benzaldehyde and the like. The preferred aldehyde is formaldehyde in anhydrous form, i.e paraformaldehyde, the low molecular weight polymer of formaldehyde.

The following examples illustrate the two procedures for preparing the resins in accordance with this invention. In Example I, all three reactants are present initially and the complete reaction conducted in one step; in Example II phenol and formaldehyde are permitted to react initially and then furfuryl alcohol is added.

EXAMPLE I

A glass reaction vessel equipped with agitator, thermometer, Bidwell trap, and reflux condensor was charged with 94 parts phenol, 90 parts paraformaldehyde, 98 parts furfuryl alcohol, 9.5 parts zinc naphthenate and 86.6 parts toluene. The mixture was stirred and heated at 100° C. for a period of three hours. The temperature was then raised to 110° C. for another three hours during which time a total of 29 parts of water were collected from the Bidwell trap. Vacuum was then applied and the toluene distilled from the reaction mixture at 40°-60° C. and 20-40 millimeters of mercury to leave 243 parts of viscous amber resin. Analysis of the resinous product by gas chromatography showed the presence of 7.5% phenol monomer, 8.5% furfuryl alcohol monomer and 1.2% formaldehyde.

The resin can be dissolved in about 1 to 2.5 parts furfuryl alcohol and applied to sand with an acid curing agent such as benzene sulfonic acid, or toluene sulfonic acid and cured at room temperature to good tensile strengths.

EXAMPLE II

A reaction vessel as described in Example I was charged with 94 parts phenol, 90 parts paraformaldehyde, 9.5 parts zinc naphthenate, and 86.8 parts toluene. The mixture was stirred and heated at 100° C. for a period of 3 hours. Furfuryl alcohol, 98 parts, was then added and heating was continued at 100° C. for a period of 8.5 hours during which time a total of 28 parts of water was collected from the trap. Vacuum was then applied and the toluene distilled from the reaction mixture at 40°–60° C. and 20–40 millimeters of mercury to leave 269 parts of viscous brown resin which solidified on cooling to ambient temperature. Analysis of the resin by gas chromatography showed the presence of 2.2% phenol monomer, 4.9% furfuryl alcohol and no detectable formaldehyde.

The resin is soluble in organic solvents such as acetone, methanol, ethanol and methyl ethyl ketone and can be distributed on sand with curing agents such as hexamethylene tetramine to produce a free flowing shell molding sand that can be cured at 350°–380° F. to tensile strengths of 450–500 psi.

The resins produced in accordance with this invention are useful to coat and bind sand to form foundry cores and molds. Processes for coating sand with resins to form foundry cores and molds are well known and various coating methods are discussed in U.S. Pat. No. 4,051,301, the disclosure of which is incorporated herein.

For use as a foundry binder, the resins of this invention are dissolved in a solvent such as, for example, furfuryl alcohol. Conventional acid type curing agents such as toluene sulfonic acid and benzene sulfonic acid can be used to cure the resins for use in foundry binder compositions.

EXAMPLE III

Using the general procedure of Example I, a resin was prepared using 1.0 mole phenol, 2.2 moles formaldehyde and 1.0 mole furfuryl alcohol. Zinc naphthenate was used as the catalyst in an amount corresponding to 0.8% by weight of the reactants. The resin produced contained 10.2% free phenol, 5.6% furfuryl alcohol monomer and 0.6% free formaldehyde.

EXAMPLE IV

Using the general procedure of Example II, a terpolymer was prepared using 1.0 mole phenol, 2.2 moles formaldehyde and 1.0 mole of furfuryl alcohol. Zinc naphthenate was used as catalyst in an amount of 0.8% by weight of the reactants. The resin produced contained 6.7% free phenol and 16.4% furfuryl alcohol monomer.

EXAMPLES V–X

Following the general procedure of Example I, resins were prepared in one step as summarized below:

| Resin | Mole Ratio $\phi OH:CH_2O:FA$ | Catalyst Concentration | Reaction Time (Hours) | Resin Yield (%) |
|---|---|---|---|---|
| V | 1:2.2:1.0 | 0.8% Zinc Naphthenate | 13 hrs. | 95 |
| VI | 3.0:2.0:2.0 | 0.8% Zinc Naphthenate | 20 hrs. | 78 |
| VII | 1.0:2.5:1.0 | 5.0% Lead Naphthenate | 8.0 hrs. | 96 |
| VIII | 1.0:3.0:1.0 | 2.5% Lead Naphtenate | 14.75 hrs. | 95 |
| IX | 1.0:3.0:1.0 | 2.5% Calcium Naphthenate | 25 hrs. | 94 |
| X | 1.0:3.0:1.0 | 3.3% Zinc Naphthenate | 6 hrs. | 99 |

Those modifications and equivalents which fall within the spirit of the invention are to be considered a part thereof.

What is claimed is:

1. A process for preparing a terpolymer of a phenolic compound, an aldehyde and furfuryl alcohol which comprises reacting at an elevated temperature under essentially anhydrous conditions a phenolic compound, an aldehyde and furfuryl alcohol in an organic medium which forms an azeotrope with water in the presence of a divalent metallic salt soluble in said organic medium with continuous removal of the water of condensation from the reaction mixture.

2. A process in accordance with claim 1 wherein the phenolic compound, the aldehyde and the furfuryl alcohol are reacted in one step.

3. A process in accordance with claim 1 wherein the phenolic compound and the aldehyde are reacted together in a first step and then furfuryl alcohol is added and reacted in a second step.

4. A process in accordance with claim 1 wherein the phenolic compound is phenol and the aldehyde is formaldehyde.

5. A process in accordance with claim 1 wherein the phenolic compound is phenol and the aldehyde is paraformaldehyde.

* * * * *